United States Patent
Satoh

(10) Patent No.: US 9,544,401 B2
(45) Date of Patent: Jan. 10, 2017

(54) DEVICE AND METHOD FOR DATA COMMUNICATION USING A TRANSMISSION RING BUFFER

(71) Applicant: Hiroshi Satoh, Tokyo (JP)

(72) Inventor: Hiroshi Satoh, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 319 days.

(21) Appl. No.: 14/168,339

(22) Filed: Jan. 30, 2014

(65) Prior Publication Data

US 2014/0237072 A1 Aug. 21, 2014

(30) Foreign Application Priority Data

Feb. 18, 2013 (JP) ................. 2013-029467

(51) Int. Cl.
*G06F 15/16* (2006.01)
*H04L 29/06* (2006.01)

(52) U.S. Cl.
CPC ................... *H04L 69/16* (2013.01)

(58) Field of Classification Search
CPC ....................................... H04L 69/16
USPC ........................ 709/219, 230, 232
See application file for complete search history.

(56) References Cited

U.S. PATENT DOCUMENTS

| 7,356,756 B1* | 4/2008 | Chan | H03M 13/356 |
| | | | 714/781 |
| 8,650,341 B2* | 2/2014 | Dawson | H04L 49/90 |
| | | | 710/38 |
| 2001/0020280 A1* | 9/2001 | Bastin | G10L 19/005 |
| | | | 714/1 |
| 2005/0141418 A1* | 6/2005 | Moon | H04L 49/90 |
| | | | 370/229 |
| 2009/0060084 A1 | 3/2009 | Nakagawa | |
| 2009/0074012 A1* | 3/2009 | Shaffer | H04J 3/0632 |
| | | | 370/516 |
| 2012/0014335 A1 | 1/2012 | Adachi | |

FOREIGN PATENT DOCUMENTS

| JP | 2000-216788 | 8/2000 |
| JP | 2005-148904 | 6/2005 |
| JP | 2010-166401 | 7/2010 |
| JP | 4669039 | 1/2011 |

* cited by examiner

*Primary Examiner* — Viet Vu
(74) *Attorney, Agent, or Firm* — Harness, Dickey & Pierce, P.L.C.

(57) ABSTRACT

A data communication device includes a storage unit configured to store transmission data in a transmission ring buffer area; a read-out processing unit configured to read out the transmission data from the storage unit; and a transmission and reception processing unit configured to transmit the read-out transmission data to an external network and receive a reception confirming notification for the transmitted transmission data. The transmission and reception processing unit is configured to control the read-out processing unit so that the transmission data to be transmitted is read out based on a storage position of last data of the transmission data stored in the transmission ring buffer area and a storage position of last data of the transmitted transmission data indicated by the reception confirming notification.

12 Claims, 4 Drawing Sheets

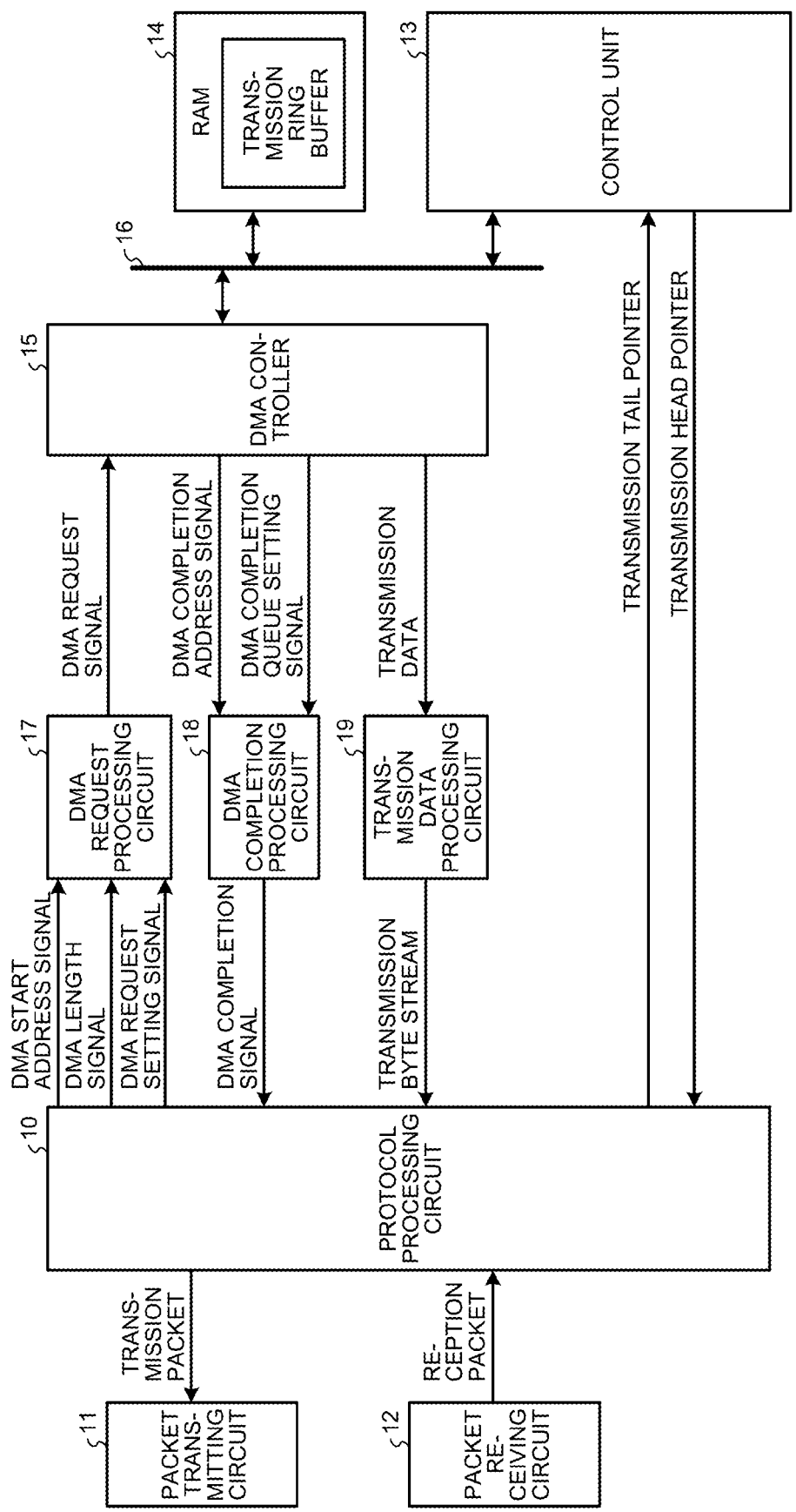

FIG.2

| NO | PROTOCOL PROCESSING CIRCUIT 10 | DMA CONTROLLER 15 |
|---|---|---|
| 1 | (1): START TCP TRANSMISSION PROCESSING<br>(2): ENQUEUE PARAMETERS BELOW IN DMA REQUEST QUEUE<br>• ADDRESS AT WHICH HEAD BYTE OF NEW TRANSMISSION DATA IS STORED OF TRANSMISSION RING BUFFER AREA (NEXT TRANSMISSION NUMBER CORRESPONDING STORAGE POSITION)<br>• DATA LENGTH OF TRANSMISSION DATA (NUMBER OF BYTES) | |
| 2 | | (1): DEQUEUE FROM DMA REQUEST QUEUE<br>(2): EXECUTE DMA<br>(3): ENQUEUE IN DMA COMPLETION QUEUE |
| 3 | (1): DEQUEUE FROM DMA COMPLETION QUEUE<br>(2): GENERATE TCP SEGMENT FROM TRANSMISSION DATA TRANSFERRED IN FIFO<br>(3): GENERATE IP PACKET FROM TCP SEGMENT<br>(4): TRANSMIT IP PACKET | |

DEVICE AND METHOD FOR DATA COMMUNICATION USING A TRANSMISSION RING BUFFER

CROSS-REFERENCE TO RELATED APPLICATION

The present application claims priority to and incorporates by reference the entire contents of Japanese Patent Application No. 2013-029467 filed in Japan on Feb. 18, 2013.

BACKGROUND OF THE INVENTION

1. Field of the Invention

The present invention relates to a network communication field and especially to a device and a method for data communication in which a communication is performed by using a protocol, such as a transmission control protocol/internet protocol (TCP/IP), by which data is transmitted and received in a byte stream.

2. Description of the Related Art

A data communication by a TCP/IP is widely used in a network communication. In the TCP/IP, a receiving end transmits a reception confirming notification (acknowledge) indicating to what extent data is received to a transmitting end in a data communication. The data transmitting end is configured to control a transmission of data by receiving the acknowledge and retransmit the data when not receiving the acknowledge within a predetermined period of time to perform a precise data communication. It is therefore necessary at the transmitting end to retain the data which is even transmitted already once until receiving the acknowledge from the receiving end.

It has been common in conventional techniques that a processing of the retention of such transmission data is performed in a data transmission circuit depending on a transmission frame format. In this case, it is necessary to retain all pieces of the transmission data before receiving the acknowledge from the receiving end in the data transmission circuit. For this reason, the data transmission circuit is required to secure a buffer with a capacity necessary for retaining the transmission data and especially a high-speed data communication processing comes to require a high-capacity transmission buffer.

In a data processing related to the data communication, there have been a variety of proposals. For example, Japanese Laid-open Patent Publication No. 2010-166401 discloses a technique, in a transmission by frame over a plurality of channels, of assigning a sequence number to each divided frame and transmitting the frame to another wireless terminal. Besides, Japanese Laid-open Patent Publication No. 2005-148904 discloses a ring buffer controlling method in which a pointer is managed by a bit count which is obtained by adding one bit to an address bit count determined depending on a size of a ring buffer, the bit added in counting up the bit count from an end address of the ring buffer and returning to a head address is inverted, and a pointer for writing and a pointer for reading are compared to detect whether the ring buffer is full or empty.

While it is required to realize a high-speed performance, which is one of merits in the case of realizing the function corresponding to the TCP/IP by hardware, in communication, there is a problem that a buffer with significantly high capacity is required for a transmission processing and causes a high cost.

Therefore, there is a need for a data communication device capable of balancing high-speed performance in data communication and cost by a transmission control by using a transmission buffer of a ring buffer format.

SUMMARY OF THE INVENTION

It is an object of the present invention to at least partially solve the problem in the conventional technology.

According to an embodiment, there is provided a data communication device that includes a storage unit configured to store transmission data in a transmission ring buffer area; a read-out processing unit configured to read out the transmission data from the storage unit; and a transmission and reception processing unit configured to transmit the read-out transmission data to an external network and receive a reception confirming notification for the transmitted transmission data. The transmission and reception processing unit is configured to control the read-out processing unit so that the transmission data to be transmitted is read out based on a storage position of last data of the transmission data stored in the transmission ring buffer area and a storage position of last data of the transmitted transmission data indicated by the reception confirming notification.

According to another embodiment, there is provided a data communication method that includes reading out transmission data stored in a transmission ring buffer area; transmitting the read-out transmission data; and receiving a reception confirming notification for the transmitted transmission data. The reading out includes reading out the transmission data to be transmitted based on a storage position of last data of the transmission data stored in the transmission ring buffer area and a storage position of last data of the transmitted transmission data indicated by the reception confirming notification.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a block diagram in regard to an embodiment of a data communication device according to the present invention;

FIG. 2 is an explanatory view of a procedure of a read-out processing and a transmission processing of transmission data;

DETAILED DESCRIPTION OF THE PREFERRED EMBODIMENTS

Figure 3:
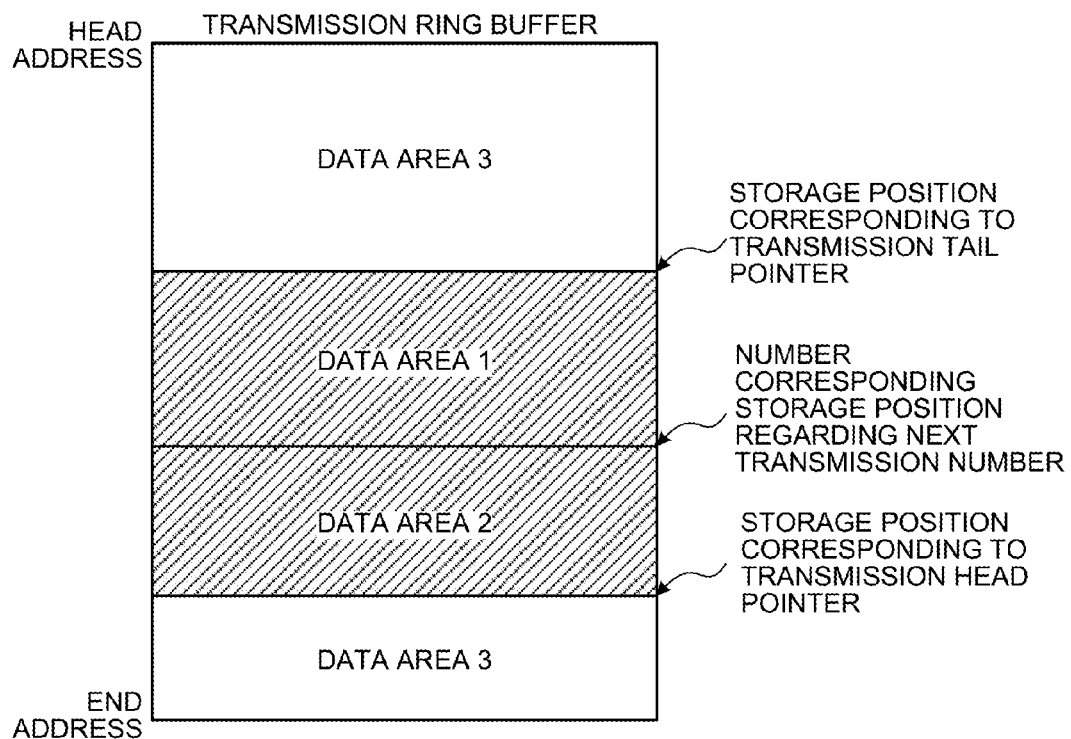
FIG. 3 is an explanatory view of a storage processing of transmission data in regard to a transmission ring buffer.

FIG. 1 is a block diagram in regard to an embodiment of a data communication device according to the present invention. A protocol processing circuit 10 is provided with a function of transmitting and receiving data based on TCP/IP. An IP packet generated in the protocol processing circuit 10 is transferred to a packet transmitting circuit 11 and transmitted to a data communication device as a destination of the transmission via an external network, not shown, from the packet transmitting circuit 11. A packet receiving circuit 12 transfers an IP packet received via the network to the protocol processing circuit 10, so that the data is processed in the protocol processing circuit 10. In this example, the protocol processing circuit 10, the packet transmitting circuit 11, and the packet receiving circuit 12 may be collectively referred to as a transmission and reception processing unit.

A control unit 13 performs a control in regard to an operation of an entirety of the device and a writing processing of transmission data to a random access memory (RAM) 14 in data transmission. The RAM 14 as a storage unit is provided with a function of storing data necessary in data processing and retaining transmission data in a ring buffer format. A direct memory access (DMA) controller 15, which is provided with a function of reading out data directly from the RAM 14, reads out transmission data retained in the RAM 14 and transmits the transmission data to the protocol processing circuit 10 via a transmission data processing circuit 19 which will be explained later. The control unit 13, the RAM 14 as a storage unit, and the DMA controller 15 as a read-out processing unit are configured to transmit and receive data by being connected to each other by a system bus 16.

A DMA request processing circuit 17, which is connected between the protocol processing circuit 10 and the DMA controller 15, outputs a DMA request signal to the DMA controller 15 based on a DMA request setting signal from the protocol processing circuit 10. A DMA completion processing circuit 18, which is connected between the protocol processing circuit 10 and the DMA controller 15, outputs a DMA completion signal to the protocol processing circuit 10 based on a DMA completion queue setting signal from the DMA controller 15. The transmission data processing circuit 19 receives transmission data read out by the DMA controller 15 and outputs, as a transmission byte stream, the transmission data to the protocol processing circuit 10 in a first-in first-out (FIFO) format.

The control unit 13 performs a writing processing in which byte sequence of transmission data is stored in a transmission ring buffer area set in the RAM 14. Then, the control unit 13 performs a processing of shifting a transmission head pointer to a position subsequent to a storage position of the last data of the stored byte sequence, i.e., at an address of a writing start position in writing a byte sequence of a new piece of data in a next writing processing. The transmission head pointer is processed so that a value increases depending on a writing processing from a head address, as an initial value, of the transmission ring buffer area and returns to the initial value in exceeding an end address of the transmission ring buffer area. The transmission head pointer is updated as needed to be set depending on a storage position of the last data of the stored transmission data.

The protocol processing circuit 10 stores, as an internal variable (hereinafter referred to as "next transmission number"), a value obtained by adding "one" to a sequence number corresponding to the last data included in an already transmitted IP packet, i.e., a sequence number corresponding to head data included in a next IP packet in transmitting the next IP packet. In addition, the protocol processing circuit 10 stores, as an internal variable (hereinafter refereed to as "initial transmission number", a sequence number corresponding to initial transmission data at the time point when the TCP session is established.

In this case, transmission data corresponding to the initial transmission number is configured to be stored at a head address of the transmission ring buffer area. Since the sequence number and the storage position has a correspondence relation, the storage position of the transmission data corresponds to a value for a remainder obtained by dividing a difference between the sequence number corresponding to each byte of the transmission data and the initial transmission number by the number for the storage position in the transmission ring buffer area. Therefore, the storage position corresponding to the sequence number of the transmission data is referred to as number corresponding storage position. Since the number for the storage position of the transmission ring buffer area is set to a power of two in the embodiment, it is possible to easily obtain the number corresponding storage position by extracting, in the difference between the sequence number of the transmission data and the initial transmission number, a value within an effective bit range of the transmission head pointer based on a size of the transmission ring buffer area.

The protocol processing circuit 10 receives data regarding the transmission head pointer from the control unit 13 and compares the number corresponding storage position regarding the next transmission number and the transmission head pointer. The protocol processing circuit 10 recognizes that data which needs to be newly transmitted is present when the values do not correspond and also recognizes a data volume which needs to be transmitted based on a value for a difference between the values.

The protocol processing circuit 10 then determines whether or not an IP packet including new data can be transmitted in a protocol processing status in an active TCP session. When it is determined that the IP packet can be transmitted, the protocol processing circuit 10 treats an address, where the head of the new transmission data is stored, of the transmission ring buffer area (the number corresponding storage position of the next transmission number) as a DMA start address signal. Besides, the protocol processing circuit 10 treats a length of data to be transmitted as a DMA length signal and outputs, together with the DMA start address signal, a DMA request setting signal to the DMA request processing circuit 17. When the DMA request setting signal is input, the DMA request processing circuit 17 enqueues the DMA start address signal and the DMA length signal in a DMA request queue. The DMA controller 15 performs a read-out processing based on the DMA start address and the DMA length input in the DMA request queue when detecting the DMA request signal indicating that an effective request is input in the DMA request queue.

In the read-out processing, the DMA controller 15 reads out data for the number of bytes corresponding to the DMA length from the storage position, as a head for the reading, corresponding to the DMA start address in the transmission ring buffer area and transfers the data to the transmission data processing circuit 19. On completion of the transfer of the read-out data, the DMA controller 15 treats the DMA start address as a DMA completion address signal and outputs the DMA completion address signal to the DMA completion processing circuit 18. When a DMA completion queue setting signal is input, the DMA completion processing circuit 18 enqueues the DMA completion address signal in a DMA completion queue.

When detecting the DMA completion signal indicating that an effective completion response is input in the DMA completion queue, the protocol processing circuit 10 determines, based on the DMA completion address input in the DMA completion queue, what DMA request the completed read-out processing corresponds to. The protocol processing circuit 10 reads out the transmission data stored in the transmission data processing circuit 19 as a transmission byte stream in the first-in first-out (FIFO) format and generates a TCP segment based on the read transmission data. The protocol processing circuit 10 then generates an IP packet based on the generated TCP segment and transmits the IP packet to the network via the packet transmitting circuit 11.

FIG. 2 is an explanatory view of a procedure of the read-out processing and the transmission processing of the transmission data explained above. This example shows a procedure of a case of transmitting one IP packet.

With respect to the data transmitted in this manner, a reception confirming notification is returned from a receiving end. In the reception confirming notification, a processing of notifying a data communication device at a transmitting end of a value obtained by adding "one" to a sequence number corresponding to the last data of continuously received transmission data (hereinafter referred to as "reception number") in data processing in a data communication device at the receiving end, is performed. The protocol processing circuit 10 stores the latest reception number received in the packet receiving circuit 12 as an internal variable and transmits a number corresponding storage position regarding the reception number to the control unit 13 as a transmission tail pointer. Therefore, data within a range between the transmission tail pointer and the number corresponding storage position regarding the next transmission number in the transmitted data in the transmission ring buffer area is data for which the reception confirming notification is not returned from the receiving end. The protocol processing circuit 10 executes a retransmission processing of the data for which the reception confirming notification is not returned depending on a TCP processing status. The retransmission processing of the data is performed in the same manner as the transmission processing of the transmission data explained above. The control unit 13 treats the range from the transmission head pointer along a forward direction to the transmission tail pointer in the transmission ring buffer area as an area in which new transmission data can be stored and performs a writing processing of transmission data.

FIG. 3 is an explanatory view of a storage processing of transmission data in regard to the transmission ring buffer. In the transmission ring buffer area, transmission data is sequentially stored from the head address and the data storage is performed by returning to the head address when transmission data is stored to the end address. In this example, transmission data which is once transmitted, however, for which a reception confirming notification is not returned is stored in a range from the transmission tail pointer to the number corresponding storage position regarding the next transmission number (data area 1). Transmission data not transmitted yet is stored in a range from the number corresponding storage position regarding the next transmission number to the transmission head pointer (data range 2). A range from the transmission head pointer along the forward direction to the transmission tail pointer (data area 3) is an area in which no transmission data is stored and data can be stored.

Figure 4:
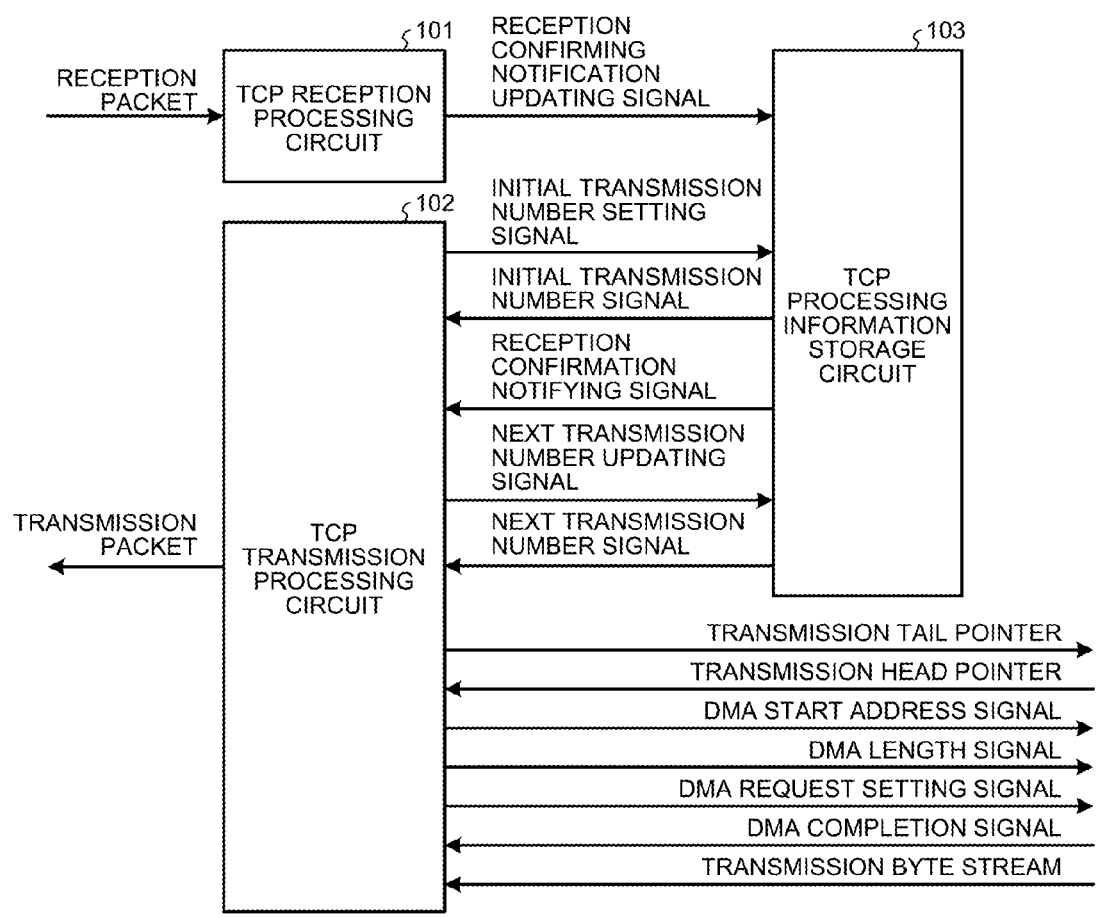
FIG. 4 is a block diagram of an example of a configuration of a protocol processing circuit.

FIG. 4 is a block diagram of an example of a configuration of the protocol processing circuit 10. The protocol processing circuit 10 is provided with a TCP reception processing circuit 101, a TCP transmission processing circuit 102, and a TCP processing information storage circuit 103. The TCP reception processing circuit 101 extracts a reception confirming notification included in a received IP packet from the TCP at the receiving end and outputs the extracted notification as a reception confirming notification updating signal to the TCP processing information storage circuit 103. The TCP processing information storage circuit 103 retains and outputs as a reception confirmation notifying signal to the TCP transmission processing circuit 102 the reception confirming notification updating signal. The TCP processing information storage circuit 103 retains an initial transmission number setting signal that the TCP transmission processing circuit 102 outputs in starting a processing of a TCP session and outputs the signal as an initial transmission number to the TCP transmission processing circuit 102. The TCP processing information storage circuit 103 retains a next transmission number updating signal which is updated when the TCP transmission processing circuit 102 performs a transmission processing of new transmission data and outputs the signal as a next transmission number signal to the TCP transmission processing circuit 102.

The TCP transmission processing circuit 102 calculates a number corresponding storage position regarding the reception confirmation notifying signal (reception number) based on the difference between the initial transmission number and the reception confirmation notifying signal (reception number), and outputs the calculated number corresponding storage position as a transmission tail pointer.

The TCP transmission processing circuit 102 calculates a number corresponding storage position regarding a next transmission number signal based on a difference between the initial transmission number and the next transmission number signal. When there is a difference between the calculated number corresponding storage position and the transmission head pointer transmitted from the control unit 13, the TCP transmission processing circuit 102 determines that new transmission data is stored. When the new transmission data is stored, the TCP transmission processing circuit 102 treats the number corresponding storage position regarding the next transmission number signal as a DMA start address signal, treats a data length of transmission data, to be stored in a payload part, of the transmission packet as a DMA length signal, and outputs the signals. The TCP transmission processing circuit 102 then outputs the DMA request setting signal to instruct the DMA controller 15 to read out the transmission data. The DMA controller 15 reads out transmission data with a length corresponding to the DMA length signal from the DMA start address signal as a head from the transmission ring buffer area and writes the read transmission data in the transmission data processing circuit. The DMA controller 15 outputs a DMA completion signal at the time of completion of the read-out processing. The TCP transmission processing circuit 102 reads out transmission byte stream in the FIFO format from the transmission data processing circuit when detecting the DMA completion signal, sequentially generates a TCP segment and an IP packet in which the transmission byte stream is a payload, and performs a transmission to the network as a transmission packet.

The TCP transmission processing circuit 102 compares the reception confirmation notifying signal and the next transmission number signal to determine whether or not a difference not less than a predetermined extent is present. When a difference not less than a predetermined extent is present, the TCP transmission processing circuit 102 outputs the number corresponding storage position regarding the reception confirmation notifying signal as the DMA start address signal, and the data length to be stored in the payload part of the transmission packet as the DMA length signal. The TCP transmission processing circuit 102 then outputs the DMA request setting signal to instruct the DMA controller 15 to perform a read-out processing. The DMA controller 15 reads out transmission data with a length corresponding to the DMA length signal from the DMA start address signal as a head from the transmission ring buffer area and writes the read transmission data in the transmission data processing circuit. The DMA controller 15 outputs the DMA completion signal at the time when the read-out processing is completed. The TCP transmission processing circuit 102 reads out the transmission byte stream in the FIFO format from the transmission data processing circuit when detecting the DMA completion signal, sequentially generates a TCP segment and an IP packet in which the transmission byte stream is a payload, and transmits the TCP segment and the IP packet to the network as a transmission packet.

As explained so far, it is possible in the present invention to realize a most suitable transmission control in data communication processing by using a low-cost high-capacity memory to be used by higher layer functions as a transmission buffer and storing transmission data in the transmission buffer in a ring buffer format. It is therefore possible to realize a data communication device capable of balancing high-speed performance in data communication and cost.

According to the embodiment with the configuration explained above, it is possible by storing transmission data in a transmission ring buffer area and performing a transmission control to realize a data communication device capable of balancing high-speed performance in data communication and cost.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A data communication device, comprising:
a memory configured to store IP packet transmission data in a transmission ring buffer area;
a memory controller configured to read out the IP packet transmission data from the memory; and
at least one processor configured to
transmit the read-out IP packet transmission data to a transmission destination device through an external network, the read-out IP packet transmission data including a first sequence number associated with the transmission ring buffer area, and the read-out IP packet transmission data segmented into a plurality of packets, and
receive a reception confirming notification for the transmitted IP packet transmission data from the transmission destination device, the reception confirming notification including a second sequence number associated with the transmission destination device, the first sequence number, and a tail pointer identifier associated with the first sequence number indicating a position for a tail pointer for the transmission ring buffer area, wherein the at least one processor is configured to
control the memory controller so that the IP packet transmission data to be transmitted is read out based on a storage position of last data of the transmission data stored in the transmission ring buffer area and a storage position of last data of the transmitted IP transmission data indicated by the tail pointer identifier, and
retransmit the read-out IP packet transmission data when the transmission destination reception confirming notification is not received from the transmission destination device.

2. The data communication device according to claim 1, wherein the at least one processor is configured to control the memory controller so that data to be transmitted is read out from the IP transmission data stored in an area between a transmission head pointer corresponding to the storage position of the last data of the IP transmission data stored in the transmission ring buffer area and a transmission tail pointer corresponding to the storage position of the last data of the transmitted IP transmission data indicated by the tail pointer identifier, in the transmission ring buffer area.

3. The data communication device according to claim 2, wherein the at least one processor is configured to control the memory controller to retransmit the read-out IP packet transmission data by reading out the IP transmission data stored in the area between the transmission head pointer and the transmission tail pointer in the transmission ring buffer area.

4. The data communication device according to claim 2, wherein the at least one processor is configured to set the transmission tail pointer by associating the first sequence number of the IP transmission data with a storage position of the IP transmission data in the transmission ring buffer area.

5. A data communication method comprising:
reading out, using at least one processor, IP transmission data stored in a transmission ring buffer area;
transmitting, using the at least one processor, the read-out IP transmission data to a transmission destination device through an external network, the read-out IP packet transmission data including a first sequence number associated with the transmission ring buffer area, and the read-out IP packet transmission data segmented into a plurality of packets; and
receiving, using the at least one processor, a reception confirming notification for the transmitted IP transmission data from the transmission destination device, the reception confirming notification including a second sequence number associated with the transmission destination device, the first sequence number, and a tail pointer identifier associated with the first sequence number indicating a position for a tail pointer for the transmission ring buffer area, wherein
the reading out includes reading out the IP transmission data to be transmitted based on a storage position of last data of the IP transmission data stored in the transmission ring buffer area and a storage position of last data of the transmitted IP transmission data indicated by the tail pointer identifier, and
the receiving includes retransmitting the read-out IP packet transmission data when the transmission destination reception confirming notification is not received from the transmission destination device.

6. The data communication method according to claim 5, the method further comprising:
reading out, using the at least one processor, from the IP transmission data stored in an area between a transmission head pointer corresponding to the storage position of the last data of the IP transmission data stored in the transmission ring buffer area and a transmission tail pointer corresponding to the storage position of the last data of the transmitted IP transmission data indicated by the tail pointer identifier, in the transmission ring buffer area.

7. The data communication method according to claim 6, wherein the receiving includes:
retransmitting, using the at least one processor, data to be transmitted by read out from the IP transmission data stored in the area between the transmission head pointer and the transmission tail pointer in the transmission ring buffer area, when the reception confirming notification is not received.

8. The data communication method according to claim 6, the method further comprising:
setting, using the at least one processor, the transmission tail pointer by associating the first sequence number of the IP transmission data with a storage position of the IP transmission data in the transmission ring buffer area.

9. A data communication device, comprising:
a memory configured to store data in a transmission ring buffer area;
a memory controller configured to read out the data from the memory; and
at least one processor configured to,
generate IP packet data based on the read out data, the IP packet data being segmented into a plurality of packets and including a first sequence number associated with the transmission ring buffer area,
establish a TCP session,
transmit the generated IP packet data to a transmission destination device through an external network via the established TCP session,
receive a reception confirming notification for the transmitted IP packet transmission data from the transmission destination device, the reception confirming notification including a second sequence number associated with the transmission destination device, the first sequence number, and a tail pointer identifier associated with the first sequence number indicating a position for a tail pointer for the transmission ring buffer area, wherein the at least one processor is configured to
control the memory controller so that the IP packet transmission data to be transmitted is read out based on a storage position of last data of the transmission data stored in the transmission ring buffer area and a storage position of last data of the transmitted IP transmission data indicated by the tail pointer identifier, and
retransmit the read-out IP packet transmission data when the transmission destination reception confirming notification is not received from the transmission destination device.

10. The data communication device according to claim 9, wherein the memory controller is a DMA controller.

11. The data communication device according to claim 9, wherein the transmitting the generated IP packet data includes:
output a memory start address signal and memory length signal to the memory controller, the memory start address signal based on the storage position of last data of the transmission data.

12. The data communication device according to claim 11, wherein the memory controller is configured to:
enqueue the memory start address signal and DMA length signal in a request queue; and
perform the read out operation based on the enqueued information in the request queue.

* * * * *